JOHN M. HUNT
INVENTOR

BY Darby & Darby
ATTORNEY

JOHN M. HUNT
INVENTOR

BY Darby & Darby
ATTORNEY

May 31, 1960     J. M. HUNT     2,938,277
NAVIGATION TRAINING APPARATUS
Filed March 22, 1957     8 Sheets-Sheet 5
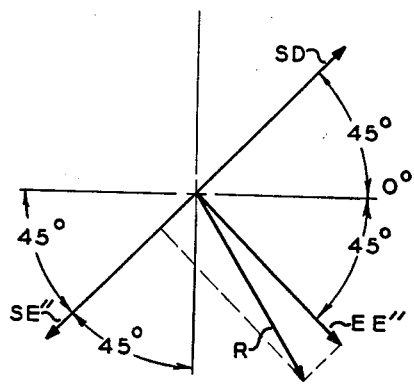
FIG. 5 a
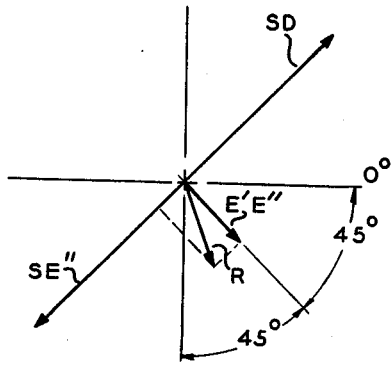
FIG. 5 b
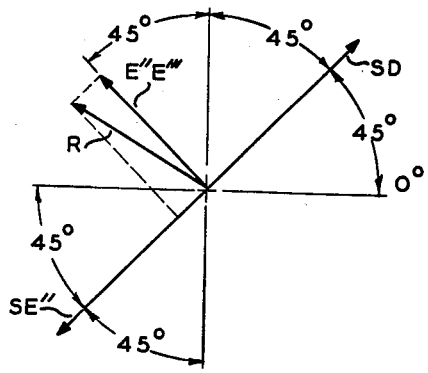
FIG. 5 c
FIG. 5
JOHN M. HUNT
INVENTOR
BY Darby & Darby
ATTORNEY

JOHN M. HUNT
INVENTOR

BY Darby & Darby
ATTORNEY

JOHN M. HUNT
INVENTOR

BY Darby & Darby
ATTORNEY

United States Patent Office 2,938,277
Patented May 31, 1960

2,938,277
NAVIGATION TRAINING APPARATUS

John M. Hunt, Binghamton, N.Y., assignor to General Precision, Inc., a corporation of Delaware Filed Mar. 22, 1957, Ser. No. 648,462

23 Claims. (Cl. 35—10.2)

This invention relates to navigation training apparatus, and more specifically to improved apparatus for training and testing persons in navigation by radio signals. While not limited to use therewith, the apparatus of the invention is of particular use in conjunction with conventional flight trainers and simulators for teaching and testing perons in navigation by means of radio marker signals. Radio transmitting stations have been installed specifically to aid aircraft navigation in most civilized areas of the world. A common type of navigational radio aid is the radio range station, which transmits coded A and N signals in well known fashion, each signal being transmitted in two directions, i.e., in two figure-eight patterns. The A and N signals of the two patterns are transmitted alternately, the sound portion of one being transmitted during the space of silence interval of the other. If located in an area in which both signals are received with substantially equal strength or intensity, a continuous tone will be emitted by an aircraft radio range receiver. The four areas associated with each radio range station at which the signals overlap to enable such a continuous tone to be heard are known as the "legs" of the range station. To enable aircraft pilots to distinguish between the four areas associated with a particular range station marker beacons have been provided. Such beacons commonly comprise transmitters which transmit individual coded signals upwardly over a limited portion of a range leg so that the coded signals from a particular marker beacon are received only when the aircraft is situated within a particular area over the marker beacon transmitter. The A and N signals transmitted by the radio range station itself are transmitted substantially horizontally, which creates an area over the range station in which the range signals are not received. This area is known as the "cone of silence" of the range station. To enable pilots to identify the cone of silence and readily to distinguish aircraft location within a cone of silence from receiver failure, some radio range stations are provided with marker beacon facilities known as Z markers, which comprise transmitters arranged to transmit a coded signal upwardly throughout the range station cone of silence. Further, since most range station legs cover a wide area, it has become common to provide two different marker beacons on many radio range station legs in order to enable a pilot to determine his position on a given range leg with greater precision. In addition to the Z markers and markers which are located along radio range legs, markers sometimes are located at other positions relative to radio range station transmission patterns.

Marker beacons have long been an extremely important radio aid to navigation, and with the increase in air traffic density proper use of marker beacon facilities has become a vital aspect of aircraft navigation training. A number of arrangements for simulating marker beacon facilities are known in the prior art, and while they have received widespread usage, most of them suffer from one or more disadvantages, some of which will become obvious and others of which will be pointed out herein as the description of the present invention proceeds.

It is therefore a primary object of the invention to provide improved apparatus for simulating the operation of simulated aircraft radio receiving equipment.

It is a further object of the invention to provide an economical and practical means for simulating radio reception in accordance with navigation with respect to a plurality of simulated radio stations.

It is another object of the invention to provide means of the above described type in which the location, angular orientation and radiation pattern characteristics of the simulated radio stations may be adjusted easily.

It is an additional object of the invention to provide multiplexing means in apparatus of the above-described type in order that many portions of the apparatus need not be duplicated or multiplied for the simulation of large numbers of simulated stations.

It is another object of the invention to provide apparatus which is readily attachable to many contemporary grounded trainers and simulators.

Numerous other objects will appear hereinafter and be made apparent as the description proceeds.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Figs. 5a, 5b and 5c are vector diagrams useful in understanding certain voltage relationships which vary as the invention operates;

Figure 2:
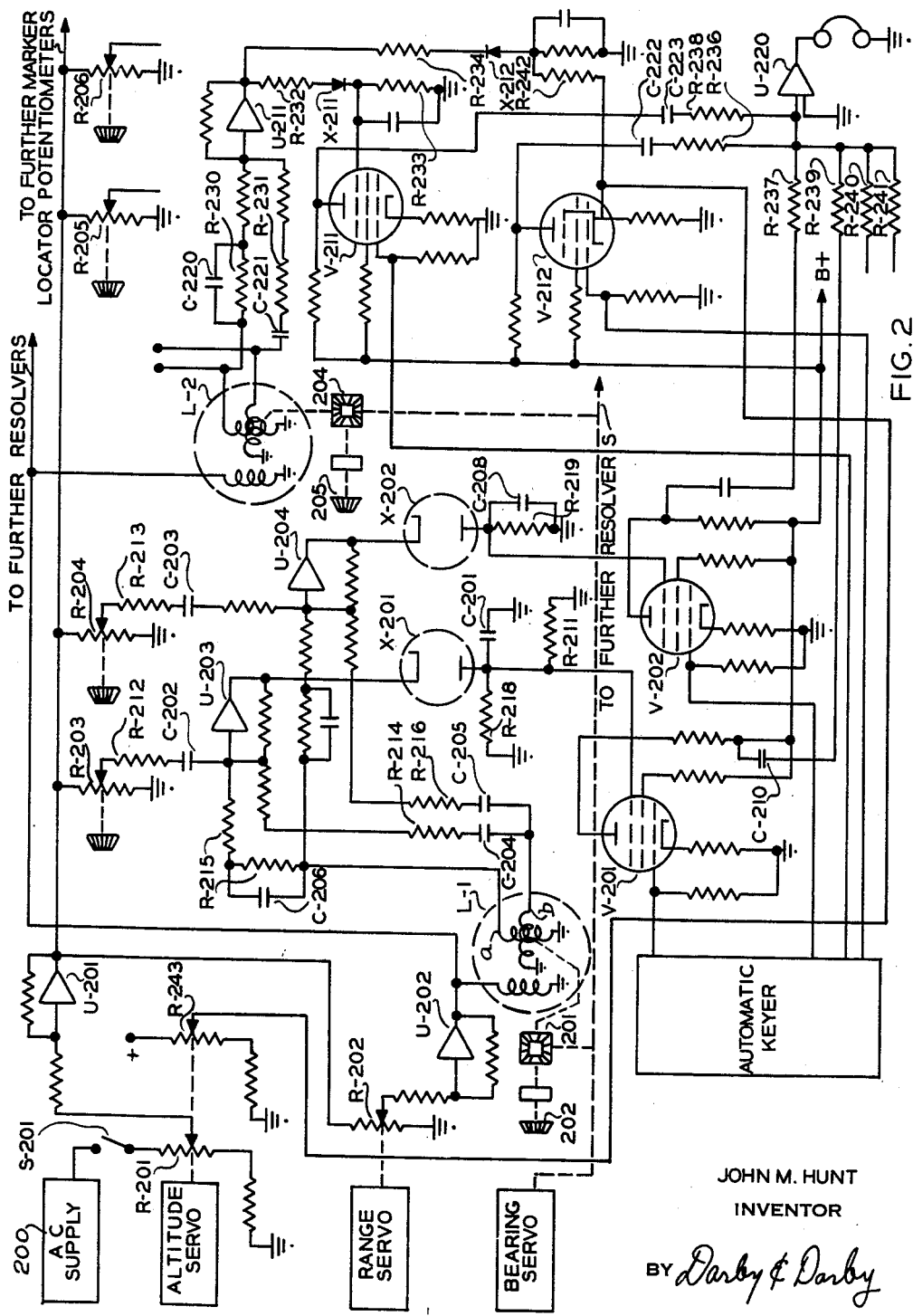
Fig. 2 is an electrical schematic diagram illustrating portions of one embodiment of the invention.
Figure 6:
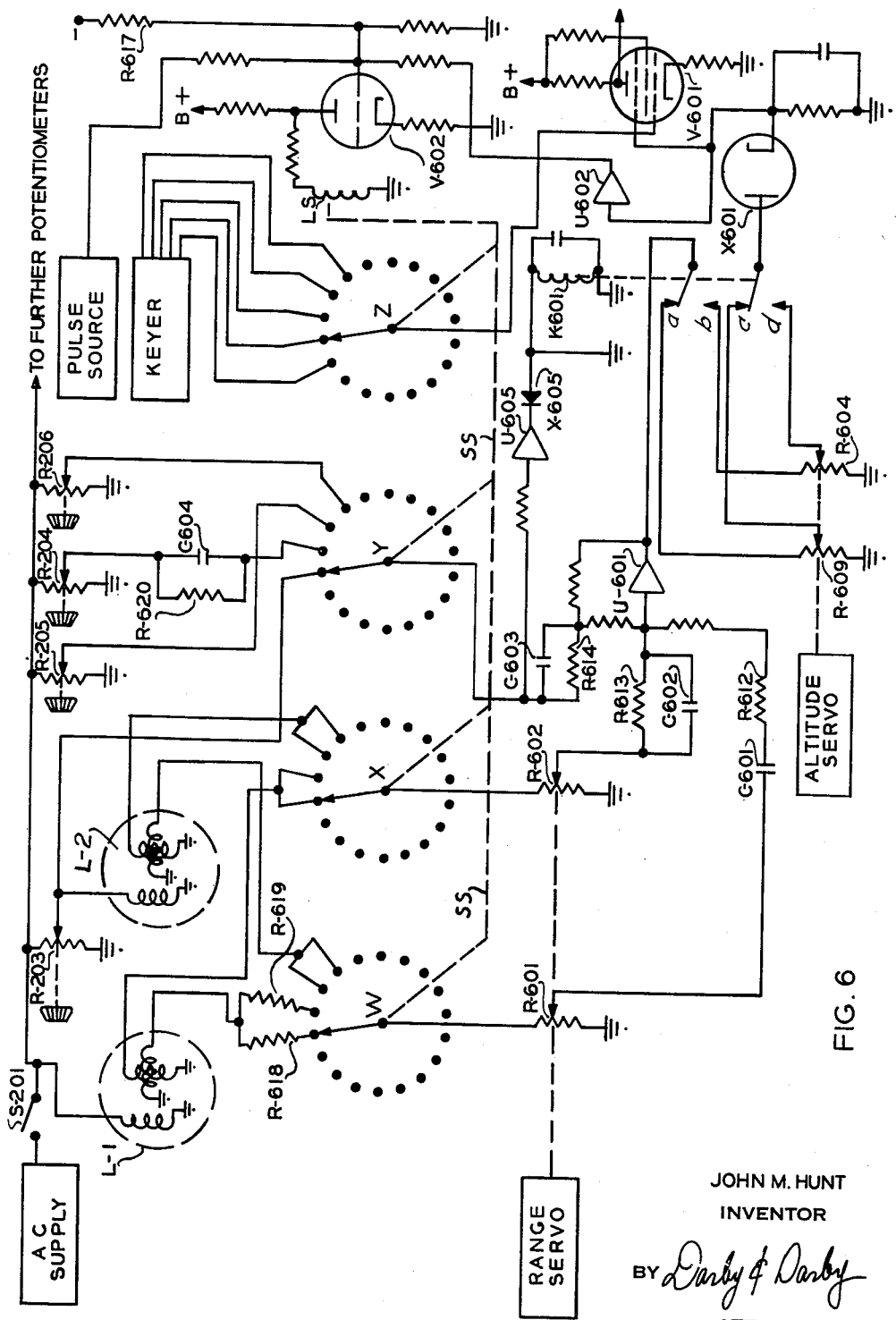
Fig. 6 is an electrical schematic diagram generally similar to Fig. 2 but illustrating how one form of multiplexing arrangement may be incorporated into the invention.
Figure 7:
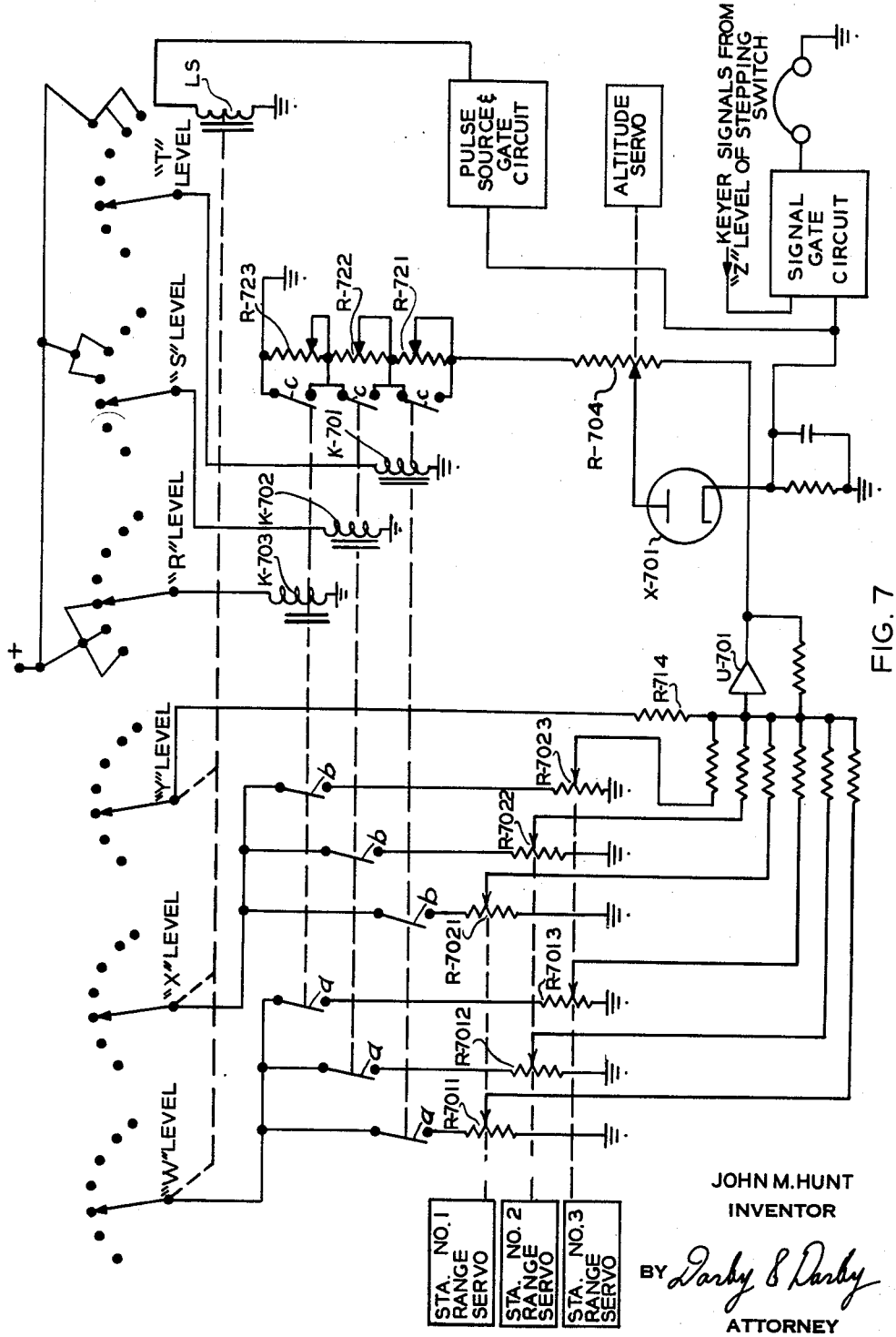
Figure 8:
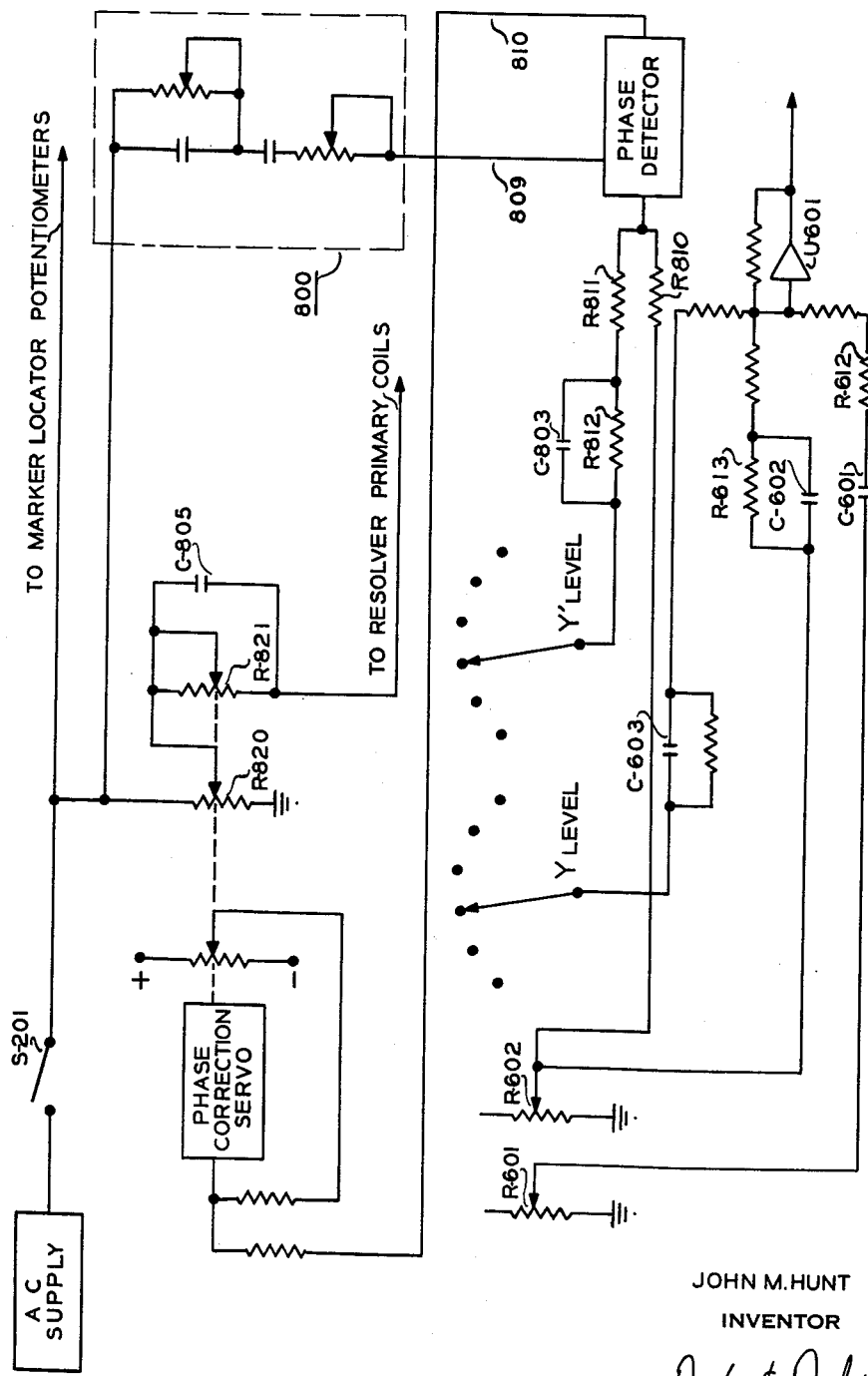

Fig. 7 is an electrical schematic diagram generally similar to those of Figs. 2 and 6, but illustrating one alternative multiplexing arrangement which may be incorporated into the invention; and Fig. 8 is an electrical schematic diagram illustrating an exemplary form of phase-correcting apparatus which may be used in conjunction with the invention to provide more accurate simulation while allowing the use of economical uncompensated resolvers.

Figure 1:
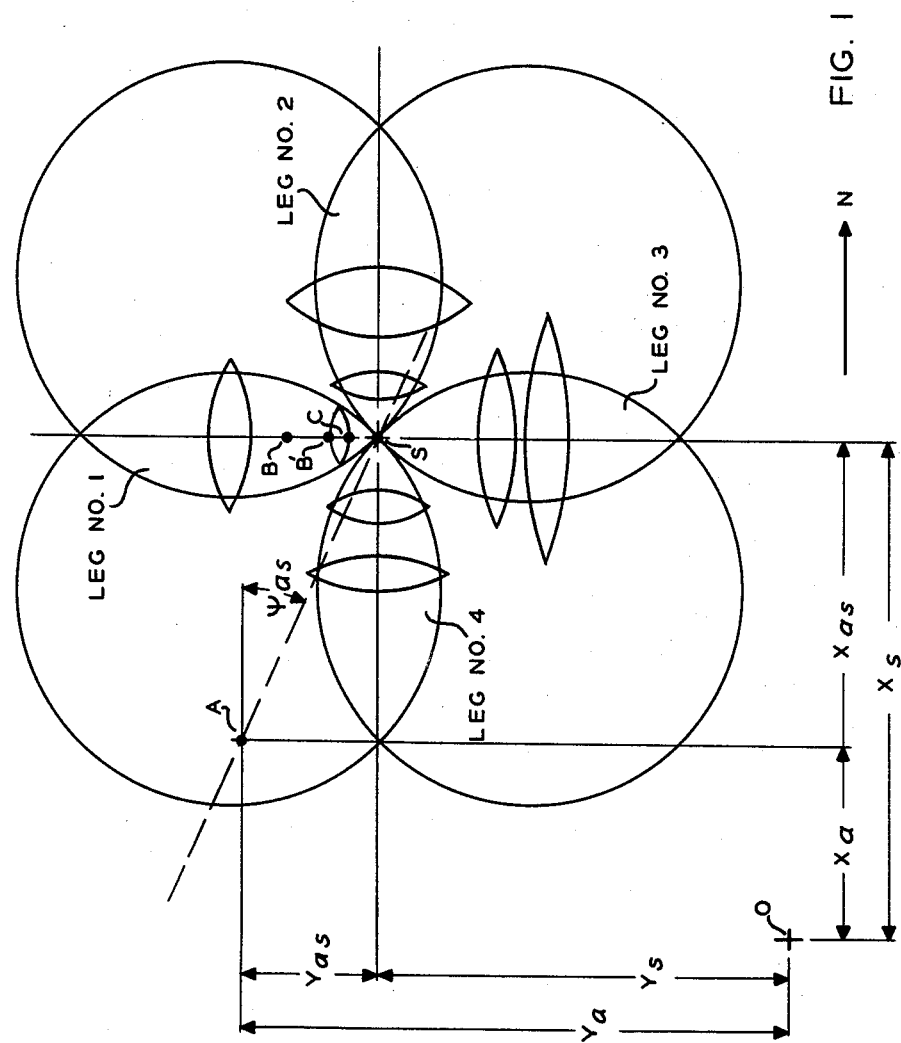
Fig. 1 is a map illustrating typical relative locations of a radio range station and a number of fan markers associated with the station.

Referring now to Fig. 1, there is shown a map or plan view of a simulated navigational problem in geometric form. An aircraft may be assumed to be located at point A, and a simulated radio range station may be assumed to be located at point S in a generally northeasterly direction from the aircraft. Radio range station S transmits A and N coded signals in two overlapping figure-8 patterns indicated by the four large circles in Fig. 1. The four range legs of station S are defined by the overlapping portions of the circles, and in Fig. 1 the legs are numbered one through four. While the range legs are shown as aligned in northerly and easterly directions in Fig. 1, and while the four legs of station S are shown angularly equally spaced at ninety-degree intervals, it is well known that various other orientations and spacings are common, and the invention is not limited to simulation of the precise arrangement shown in Fig. 1. Located on each range leg in Fig. 1 are two generally elliptical areas representing the reception areas of marker beacons, providing a total of eight marker beacons associated with radio range station S. Inasmuch as the radiation patterns of A–N transmitters and especially those of marker beacons vary with altitude, Fig. 1 may be assumed to illustrate the reception areas of the radio signals at a representative altitude. Simulation of the change in radio signals with change in altitude may be incorporated in the invention, as will be explained below. Assuming an aircraft to be flying at the altitude represented by Fig. 1, the pilot's radio range receiver should provide an A signal or an N signal whenever the aircraft is located within the areas described by one of the large circles. If located within an area corresponding to overlapping portions of two of the circles, both A and N signals will be received, and as mentioned above, the A and N signals received on the range legs complement each other so that a continuous tone is heard when flying at the middle of a range leg. Whenever flying in an area represented by one of the ellipses of Fig. 1, marker signals may be received. Such marker signals commonly actuate indicating lamps located on the aircraft instrument panel, and the signals also are heard in the pilot's or navigator's earphones. To distinguish between the various markers, the markers nearest the range station itself may be termed "inner fan markers" and those located at greater distances from the range station may be termed "outer fan" markers. Each marker beacon may be arranged to transmit a different Morse Code letter in order that the beacons may be distinguished.

Figure 3:
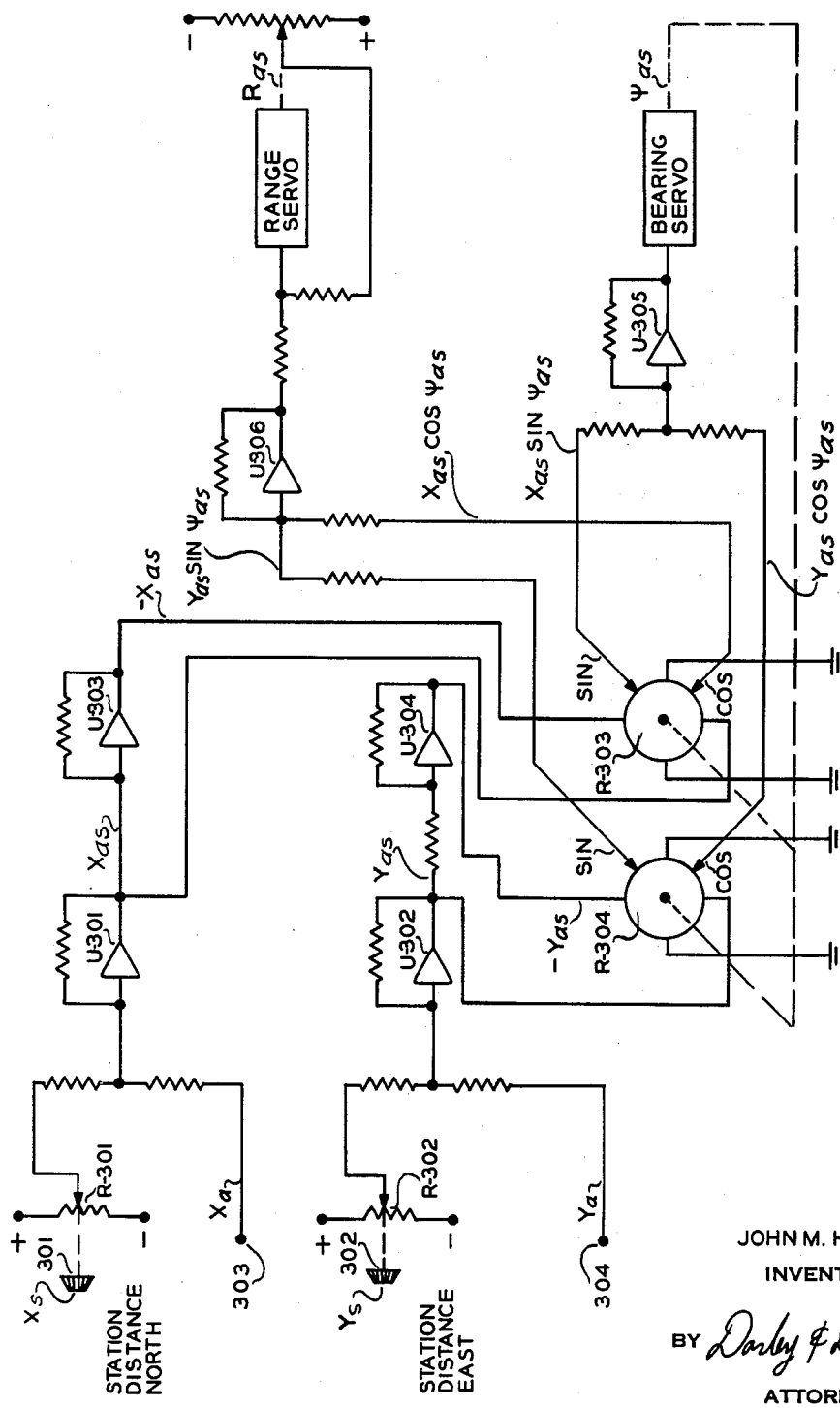
Fig. 3 is an electrical schematic diagram of a conventional grounded trainer Cartesian-to-polar coordinate converter of the type widely used in the grounded trainer and simulator industry, and which may be used in conjunction with the invention for operating certain portions of the invention in accordance with the instantaneous simulated conditions of a simulated flight.

Referring now to Fig. 3, there is shown an exemplary embodiment of a conventional analog computer Cartesian to polar coordinate converter of the type widely used in the flight trainer, instrumentation and fire control arts. Potentiometer R–301 is excited by constant potentials from the trainer power supply, and the arm of potentiometer R–301 is adjustable by an attendant or instructor by means of a control knob 301 to select a desired northerly distance of the simulated radio range station from a reference point. Potentiometer R–302 is similarly excited and may be positioned by control knob 302 to select a desired easterly distance of the simulated range station from the reference point. In Fig. 1 the reference point is indicated at O, and the simulated station northerly and easterly distances are indicated in Fig. 1 by $X_s$ and $Y_s$, respectively.

Potentials commensurate with simulated northerly and easterly distances of the simulated aircraft from the reference point are derived by conventional grounded trainer apparatus not shown and applied at terminals 303 and 304, respectively. These potentials may be computed in the manner shown in my copending application Serial Number 551,778, filed December 8, 1955, now abandoned, for "Improved Grounded Flight Trainer" or by various other arrangements. The simulated aircraft component distances from the reference point are indicated in Fig. 1 by the dimensions $X_a$ and $Y_a$. The potentials proportional to $X_a$ and $Y_a$ applied via terminals 303 and 304 are made opposite in sense to the potentials applied to summing amplifiers U–301 and U–302 from station distance potentiometers R–301 and R–302, thereby causing amplifier U–301 to provide an output potential $X_{as}$ commensurate with the difference between the distance $X_a$ and $X_s$, and causing amplifier U–302 to provide an output potential commensurate with $Y_{as}$, the difference between $Y_a$ and $Y_s$. The $X_{as}$ potential from amplifier U–301 is applied directly and also via polarity-inverting feedback amplifier U–303 to excite resolver R–303, and the $Y_{as}$ potential from amplifier U–302 is applied directly and via polarity-inverting amplifier U–304 to excite resolver R–304. The wiper arms of resolvers R–303 and R–304 are mechanically positioned by the output rotation of a conventional trainer bearing servo shown in block form, the output shaft position of the bearing servo being a measure of $\psi_{as}$, the angle between a reference direction (North) and the line between the simulated aircraft and the simulated station. A potential commensurate with $X_{as} \sin \psi_{as}$ appearing on the sine terminal of resolver R–303 is applied to summing amplifier U–305, and a potential commensurate with $$Y_{as} \cos \psi_{as}$$

from the cosine arm of resolver R–304 is applied to amplifier U–305, which adds the two potentials to provide an error potential to drive the bearing servo. Applying elementary trigonometry to Fig. 1, it may be seen that $$X_{as} \sin \psi_{as} - Y_{as} \cos \psi_{as} = 0 \qquad (1)$$

From Expression 1 it may be understood that with given $X_{as}$ and $Y_{as}$ input potentials applied to resolvers R–303 and R–304, the bearing servo will rotate so as to minimize its error signal, thereby providing an output shaft position commensurate with the simulated bearing angle $\psi_{as}$ between the simulated aircraft and the simulated station. The potential commensurate with $Y_{as} \sin \psi_{as}$ from the sine winding of resolver R–304 and the $X_{as} \cos \psi_{as}$ potential from the cosine winding of resolver R–303 are combined by amplifier U–306 to provide an output potential from amplifier U–306 commensurate with the simulated horizontal distance or range $R_{as}$ between the simulated aircraft and the simulated station. A mechanical analog may be derived from the $R_{as}$ voltage by means of a conventional position servo shown in Fig. 3 in block form and designated as the range servo. Thus the Cartesian coordinate voltages representing northerly and easterly distances between the simulated aircraft and the simulated station location have been converted to polar form by means of the two servomechanisms shown. The specific coordinate converter shown in Fig. 3 is not a part of the present invention, and numerous substitute devices may be used in practicing the invention. The range and bearing servos illustrated in Fig. 3 may be connected to operate various equipment to be described below, and a plurality of such arrangements may be provided for simulating a plurality of simulated radio stations.

Referring now to Fig. 2, there is shown in block form an alternating current supply 200 which is connected through switch means S–201 to excite shaped potentiometer R–201, the wiper arm of which is positioned by a conventional trainer altitude servo. Supply 200 provides alternating current having a frequency compatible with certain induction resolvers to be described below, and due to the ready availability of 60 c.p.s. and 400 c.p.s. resolvers, such frequencies are preferred. Switch means S–201 is located on the student's simulated radio range marker receiver within the trainer, and the switch will be closed whenever the marker receiver in turned on. If desired, a further switch (not shown) connected in series and operable remote from the trainer cockpit may be furnished, for actuation by the instructor to disconnect supply 200 from potentiometer R–201 to simulate marker receiver failure.

Potentiometer R–201 is provided with a characteristic shape simulating the vertical variations of the radiation pattern of typical marker stations. As simulated altitude is increased, the trainer altitude servo drives the wiper arm of potentiometer R–201 downwardly as shown in Fig. 2, providing a decreased voltage to be applied to amplifier U-201. As will become evident as the description proceeds, such a decreased voltage will cause simulated marker signals to be transmitted to the student's earphones at a greater simulated distance between the simulated aircraft and a given simulated marker station, effectively increasing the areas of the ellipse-shaped zones of Fig. 1 at increased altitudes. If marker simulator apparatus constructed in accordance with the invention is intended to operate over a considerable range of simulated altitude, it will be seen that resolvers L-1 and L-2 connected to be excited from the output potential of potentiometer R-201 will receive widely varying excitation. Since most inexpensive resolvers are designed to operate at a rated primary winding excitation level, and since operation of such resolvers at varying excitation results in undesirable variation in output phase, I prefer in some embodiments of the invention to effect simulation of altitude changes by apparatus inserted at a different point within the circuit, as will be shown in detail in connection with Fig. 6. For an understanding of the alternative arrangement in Fig. 2 however, an assumption may be made that variation of resolver excitation in accordance with simulated altitude (or in accordance with simulated range, as will be explained), does not critically affect resolver accuracy.

The voltage modified in accordance with simulated altitude from potentiometer R-201 is amplified by feedback amplifier U-201 and applied to excite a plurality of potentiometers. In Fig. 2 only a few of the potentiometers supplied for use in simulating a single range-station eight-marker system are shown, and it may be noted that the output voltage from amplifier U-201 actually is connected to excite further potentiometers associated with the marker beacons of the same radio range station as well as those associated with further simulated radio range stations. The output voltage from amplifier U-201 also is applied to excite potentiometer R-202, the arm of which is positioned in accordance with the radial distance $R_{as}$ of the simulated aircraft from the simulated range station, such as by means of the conventional trainer range servo shown in Fig. 3. The voltage on the arm of potentiometer R-202 is applied via feedback amplifier U-202 to excite the primary coil of a conventional induction resolver L-1. Induction resolver L-1 comprises a primary stator coil which induces voltages in a pair of rotor secondary coils a and b. Coils a and b are fixed in mechanical quadrature relationship to each other and are, as a pair, angularly adjustable with respect to the primary coil by the mechanical analog output quantity from an angle summing device shown as comprising a conventional mechanical differential 201. Applied as input shaft positions to differential 201 are the simulated bearing angle $\psi_{as}$ shown as being supplied from the bearing servo described above, and a manual input shaft position inserted by means of control knob 202 to select a desired range leg bearing $\psi_{L1}$. The output shaft of differential 201 positions the rotor coils of resolver L-1 to an angle commensurate with the difference between the two applied input quantities.

The output voltage of amplifier U-201 is applied to excite marker locator potentiometers R-203 through R-210, each of which is associated with a single one of the eight markers shown in Fig. 1. Marker locator potentiometers R-203 through R-206 are shown in Fig. 2, and it will be understood that similar potentiometers R-207 through R-210, none of which are shown, are similarly connected to amplifier U-201. The arm of marker locator potentiometer R-203 is manually set by the instructor to select the radial distance along leg No. 1 of the inner marker from radio range station S. Potentiometer R-204 may be set to select the simulated radial distance along the same leg of the outer marker beacon. Inasmuch as most radio range stations are provided with two or less marker beacons along the same leg, I prefer to provide two manually-settable potentiometers per leg, thereby providing a total of eight marker locator potentiometers per radio range station marker system.

Secondary winding a of resolver L-1 is connected via two individual phase shift means shown as comprising parallel RC combinations to the input circuits of amplifiers U-203 and U-204. One parallel RC phase shift means comprises resistance R-215 and capacitor C-206. Perpendicularly disposed secondary winding b of resolver L-1 is shown connected through phase shift means (C-204, R-214 and C-205, R-216) shown as comprising series RC combinations to the same amplifiers. The voltage from first marker locator potentiometer R-203 is applied to the input circuit of amplifier U-203 via a phase shift means shown as comprising resistor R-212 and capacitor C-202, and the voltage from second marker locator potentiometer R-204 is applied to the input circuit of amplifier U-204 via a phase shift means shown as comprising resistor R-213 and capacitor C-203. In similar manner, a further resolver (not shown) is provided for each of the other three range legs of the simulated radio range station, a pair of marker locator potentiometers are provided for each of the other three legs, and a pair of amplifiers (not shown) similar to U-203 and U-204 are connected to receive input voltages from their respective resolvers and marker locator potentiometers by connections similar to those shown.

The output potential from amplifier U-203 is applied to a vector sum magnitude detector shown as comprising a diode rectifier X-201 which rectifies the alternating potential to provide a direct voltage which is filtered by means of a conventional rectifier filter shown as comprising resistance R-218 and capacitor C-201. The filtered direct voltage is applied to the suppressor grid of a pentode vacuum tube V-201 connected to operate as a gate. A 1020 cycle audio signal keyed by means to be described below is applied, as shown, to the control grid of pentode V-201. When the simulated aircraft is situated outside the effective reception area of the simulated marker beacon, a relatively strong negative voltage sufficient to cut off tube V-201 is produced by rectifier X-201 and applied to the suppressor grid. When the simulated aircraft is situated within a simulated marker reception zone, the negative voltage on the suppressor grid will be decreased sufficiently to allow gate tube V-201 to conduct, thereby causing the keyed marker code signals applied to the control grid to appear in amplified form at the plate circuit of gate tube V-201. The amplified signals are applied through a coupling capacitor C-210 and resistor R-239 to amplifier U-220, which amplifier applies its output signals to the student-pilot's earphones. A gate circuit similar to that shown may be provided for each of the markers to be simulated, each such further gate circuit being responsive to the voltage output of the amplifier associated with its respective simulated marker and operative to gate keyed signals corresponding to the code characters of its respective simulated marker. In Fig. 2 the output voltage from amplifier U-204 is shown connected in similar manner via rectifier X-202 and the filter comprising R-219 and C-208, to control gate tube V-202. Since as many as eight markers may be provided at each radio range station, and since it is usually desirable to provide at least four simulated radio range stations in flight and navigation training apparatus, it may be seen that a large number of gate tubes (32 in the example proposed) would be required if a different gate tube is provided for each simulated marker. To obviate the necessity for so many gate tubes, a switching arrangement may be provided, since marker beacons are very seldom, if ever, superimposed in practice. An exemplary switching arrangement is disclosed in detail in Fig. 6.

As mentioned above, gate tube V-201 conducts only when the negative output voltage from rectifier X-201 is at a low value (which, in turn, requires that the vector sum of the three input voltages applied to amplifier U–203 be low) in order for simulated marker signals to be generated. Each of the amplifier and gate circuits provided for further markers may operate similarly, so that the input voltages to the amplifiers must cancel out entirely or substantially in order for marker signals to be produced. If the simulated aircraft is located at a great distance from the radio range station, the range servo will position R–202 so as to apply a relatively large voltage $R_{as}$ to excite the primary winding of resolver L–1. A relatively large voltage will be induced in either secondary coil L–1a or in secondary coil L–1b, or in both secondary coils, depending upon the angle to which the coils of resolver L–1 are adjusted, as it may be seen that no marker signals will be transmitted to the student when the simulated aircraft is located at large distance from the station.

As mentioned above, for any simulated marker signals to be transmitted to the student, the resultant of the three input voltages applied to the amplifier (such as U–203 or U–204) feeding one of the marker gating tubes must be at a low value. The range voltage (modified in accordance with simulated altitude) applied to the primary coil of resolver L–1 induces voltages in the secondary coils of resolver L–1 in accordance with the difference between simulated aircraft-to-station bearing $\psi_{as}$ and simulated range leg No. 1 bearing $\psi_{L1}$, so that the voltage induced in secondary coil $b$ of resolver L–1 will be commensurate in magnitude with the component of aircraft-to-station range along range leg No. 1, and the voltage induced in perpendicularly disposed secondary coil $a$ of resolver L–1 will be commensurate in magnitude with the component of aircraft-to-station range transverse or perpendicular to range leg No. 1. Potentiometer R–203 may be adjusted to select a desired radial distance of the inner marker of range leg No. 1.

Assume that the simulated aircraft is located at point B on range leg No. 1 in Fig. 1 and that flight toward the station ensues. Since the difference between aircraft-to-station bearing (270°) and range leg bearing (270°) is zero when the simulated aircraft is located at point B, the rotor of resolver L–1 will be angularly positioned so that maximum voltage is induced in coil $b$ of resolver L–1 and minimum or zero voltage will be induced in coil $a$ of resolver L–1. The "along-the-leg" component voltage from coil $b$ and the marker radial distance voltage from potentiometer R–203 are each applied to amplifier U–203 after being advanced in phase 45 degrees by the series RC phase-shift network shown, and amplifier U–203 subtracts the two applied voltages. When the simulated aircraft is located at point B in Fig. 1, the along-the-leg component voltage from coil $b$ considerably exceeds the radial distance voltage from potentiometer R–203, providing a net voltage from amplifier U–203 sufficient to maintain gate tube V–201 closed. As the simulated aircraft arrives at point B' in Fig. 1, the decrease in simulated range has caused the range servo and potentiometer R–202 to decrease the excitation to resolver L–1 sufficiently to decrease the voltage from coil $b$ to such a value that the output voltage from amplifier U–203 becomes low enough to allow gate tube V–201 to begin applying keyed marker signals from the automatic keyer to the student's earphones. As the simulated aircraft continues on its easterly course toward range station S, the decrease in simulated range further decreases, thereby increasing the amplification of gate tube V–201, simulating the increase in marker signal intensity as the simulated aircraft nears the center of the elliptical marker beacon reception zone.

As the simulated aircraft passes the center of the marker zone and continues toward station S, the further decrease in the output voltage of coil $b$ will cause the output voltage from amplifier U–203 to begin to increase, providing an increasing voltage from amplifier U–203, thereby decreasing the amplification of gate tube V–201 and attenuating the marker signals received by the student.

When the simulated aircraft has reached the position indicated by point C in Fig. 1, the marker locator voltage sufficiently predominates over the range component voltage from coil $b$ to cut off gate tube V–201. Thus it may be seen that simulated marker signals are received by the student only when the simulated aircraft is passing through the simulated elliptical marker reception zone, and that the signals properly vary in intensity in accordance with simulated aircraft position within the zone.

Figure 4:
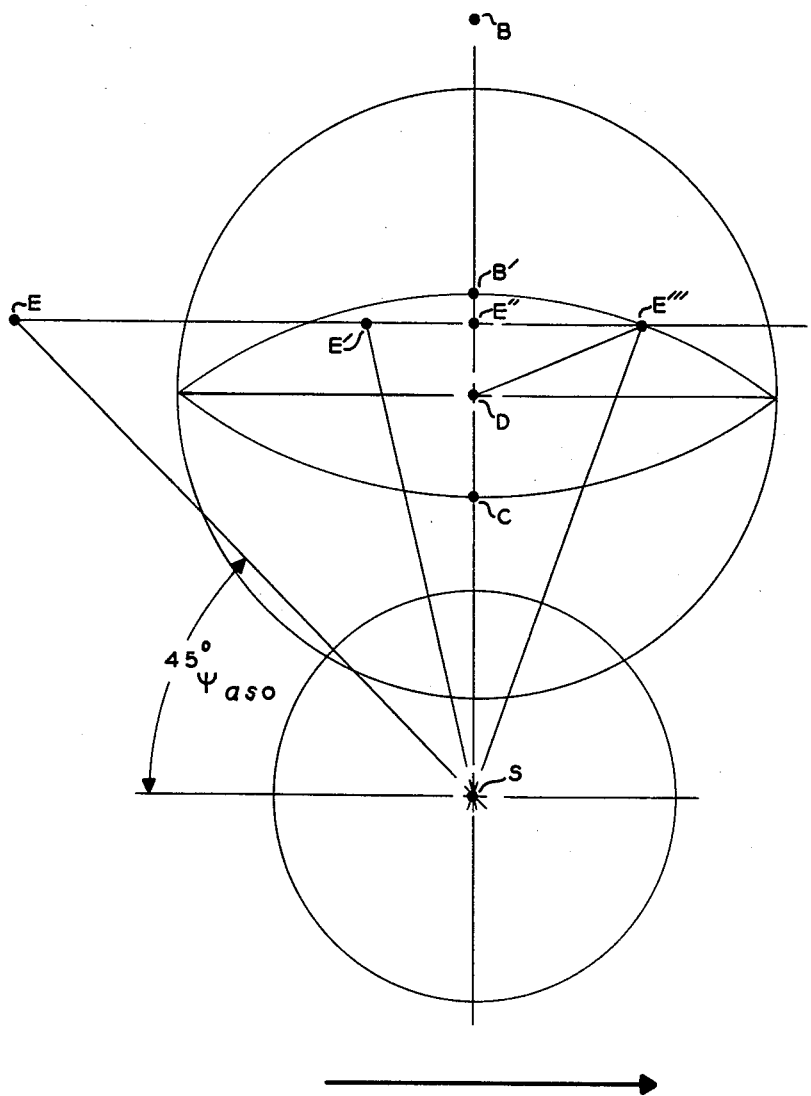
Fig. 4 is a geometrical diagram showing a plan view of a simulated marker station reception zone located at a given bearing and distance from a simulated reference point radio station.

To understand how the elliptical zones are synthesized and to illustrate operation when the simulated aircraft approaches the range station S on a course other than a range leg, reference may be had to Fig. 4, which shows the inner marker of range leg No. 1 on an enlarged scale. Assume that the simulated aircraft is located at point E at an initial bearing $\psi_{aso}$ of 225 degrees from station S, and that the aircraft is flying toward the north, toward points E', E'' and E'''. The adjustment of potentiometer R–203 to select the radial distance SD of the center of the marker zone from station S will provide a potential having a magnitude commensurate with the distance SD and a phase 45 degrees in advance of the output voltage of amplifier U–201, and such potential is indicated in Fig. 5a by the vector SD. With the bearing servo applying a shaft input to differential 201 (Fig. 2) commensurate with 225 degrees, and with control knob 202 adjusted to set range leg No. 1 at 270 degrees, the output shaft of differential 201 will have positioned the rotor coils of resolver L–1 at 270 minus 225, or 45 degrees. Inasmuch as the simulated range voltage applied to excite the primary winding of resolver L–1 is commensurate in magnitude with the distance SE in Fig. 4, it will be understood that the secondary coils of resolver L–1 will provide voltages commensurate with components SE'' and EE'' of simulated range. The potential from coil $b$ may be advanced in phase 45 degrees to provide a voltage having a magnitude and phase indicated by vector SE'' in Fig. 5a. The potential from coil $a$ may be lagged in phase 45 degrees to provide a voltage having a magnitude and phase angle indicated by vector EE'' in Fig. 5a. The three input voltages applied to amplifier U–203 when the simulated aircraft is at point E in Fig. 4 may combine to provide a resultant input voltage represented in Fig. 5a by resultant vector R. Inasmuch as the resultant voltage applied to rectifier X–201 is rectified and applied to gate tube V–201 without regard to phase, gate tube V–201 is provided with an inhibiting potential on its suppressor grid sufficient to prevent transmission of marker signals to the student.

Now assume that the simulated aircraft is located at point E' within the marker zone as shown in Fig. 4. Rotation of the bearing servo as simulated bearing changed will have rotated the rotor coils of resolver L–1, and the range servo will have adjusted excitation of the primary winding of resolver L–1 to a value which may be assumed to be commensurate with the vector SE' in Fig. 4, thereby providing input potentials to amplifier U–203 in accordance with the vectors shown in Fig. 5b. The marker location potential applied to amplifier U–203 remains the same, of course, and since the simulated aircraft has flown perpendicular to the range leg bearing in the situation illustrated, the along-the-leg component voltage assumed to be commensurate with the distance SE'' has remained the same. However, it will be seen that the transverse component voltage has decreased considerably, providing a decreased resultant voltage represented by vector R in Fig. 5b. Inasmuch as the resultant input and output voltages of amplifier U–203 are considerably decreased, it will be seen that a lesser negative potential exists on the suppressor grid of gate tube V–201, allowing the tube to apply keyed marker signals to the student's earphones. As simulated flight continues in a northerly direction and the aircraft arrives at point E'', it will be seen, and will be recalled from the previous example, that the transverse component of range potential from coil $a$ of resolver L–1 will have become zero, limiting the input voltage of amplifier U-203 to an even smaller value represented by distance DE" in Fig. 4. The decrease in amplifier input and output provides a less negative potential for application to the gate tube, thereby increasing the intensity of the marker signals transmitted to the student.

As simulaed flight proceeds to point E" in Fig. 4, the amplifier input voltage may be assumed to take the form represented by the vector diagram of Fig. 5c. As the simulated aircraft passes over the center of the range leg at point E" in Fig. 4, the angular difference between range leg bearing and aircraft-to-station bearing will change sign, providing potentials of opposite instantaneous polarity from coil $a$ of resolver L-1, as indicated by the reversal of vector E" E''' in Fig. 5c. Vectors SD and SE' remain the same as in Figs. 5a and 5b, providing a resultant input voltage to amplifier U-203 which may be assumed to be commensurate with resultant vector R of Fig. 5c. Inasmuch as point E" in Fig. 4 lies at the edge of the simulated marker beacon reception zone, it will be apparent that the magnitude of the voltage applied to amplifier U-203 is that magnitude below which marker signals are transmitted and above which marker signals are not transmitted. If the simulated aircraft were to fly in a circle centered at point D at a distance corresponding to distance DE''' in Fig. 4, it would appear initially that the input and output voltages from amplifier U-203 would remain at their critical level between gating and not gating conditions and that the resultant voltage would change solely in phase. Such would be the case if the resolver rotor coils were both connected to amplifier U-203 with the same scale factor, but in order to provide elliptical-shaped simulated marker reception zones, it is merely necessary to attenuate relatively the voltage applied to amplifier U-203 which corresponds to the component of range in the direction of the major axis of the desired ellipse. For example, if the voltage from coil $a$ of resolver L-1 is applied to amplifier U-203 with an attenuation twice as great or a gain one-half as great as the attenuation or gain between coil $b$ and amplifier U-203, the simulated marker reception zone will take substantially the form of an elipse having a major axis transverse of the range leg, which axis is twice as great as the minor axis aligned along the range leg. By varying the ratio between the scale factors connecting the resolver output voltages to amplifier U-203 the ratio of major axis to minor axis of the simulated reception zone may be varied as desired. Variable resistors (not shown) may be used at the input circuit of amplifier U-203 to facilitate such adjustment, if desired.

In view of the above explanation of the simulation of the range leg No. 1 inner marker, the operation of amplifier U-204 and its associated apparatus to simulate the range leg No. 1 outer marker will be readily apparent. Amplifier U-204 receives the same input voltages from resolver L-1 as amplifier U-203, and a marker locator potentiometer R-204 merely provides a larger potential to amplifier U-204 than potentiometer R-203 applied to amplifier U-203, effectively locating the outer marker reception zone at a greater distance along the range leg from station S. The output from gate V-202 is applied to U-220 via a coupling capacitor and resistor R-237.

Radio range station "cones of silence" usually are substantially circular in area, but if the range legs are spaced rather irregularly the cone of silence area of a particular station may be slightly elliptical or ovoid. Inasmuch as the magnitude of the voltage applied from the marker locator potentiometer associated with a particular simulated marker determines the radial distance of the marker from the range station, it should become apparent now, that I may simulate a cone of silence by providing a gate circuit which is responsive to an amplifier having no marker locator voltage applied to it. In Fig. 2, the output voltages of resolver L-2 are shown connected through phase shifters (C-220, R-230 and C-221, R-231) to amplifier U-211, although the input voltages for amplifier U-211 may be taken from any of the induction resolvers. The output voltage from amplifier U-211 is applied via resistors R-232 and R-234 to two oppositely connected rectifiers X-211 and X-212. The positive output voltage from rectifier X-212 and the negative output voltage from rectifier X-211 are filtered and applied individually to control two gate tubes V-212 and V-211. The negative voltage developed across resistor R-233 is applied to the suppressor grid of gate tube V-211. Gate tube V-211 operates similarly to gate tube V-201. When the negative output voltage from rectifier X-211 becomes low enough, V-211 applies coded Z marker signals from the automatic keyer via coupling capacitor C-223, resistor R-238 and output amplifier U-220, to the student's earphones. The positive voltage from rectifier X-212 is applied via resistor R-242 to the cathode of gate tube V-212 together with a voltage varying with simulated altitude from potentiometer R-243, the arm of which is positioned by the trainer altitude servo. Keyed A-N signals generated in conventional manner by apparatus well known in the art are applied to the grid of pentode V-212, and it will be seen that application of a positive potential to the cathode of V-212 will tend to drive the tube toward cutoff, first decreasing and then eliminating the A-N signal voltages applied by gate tube V-212 via C-222 and R-236 to the output circuit. Although the potential applied to gate tube V-212 from rectifier X-212 is a function of simulated altitude because the input voltage to resolver L-2 has been determined by the position of potentiometer R-201, a further means has been supplied to affect operation of gate tube V-201 as a function of altitude because radio range A-N signals vary with altitude in a somewhat different manner from marker beacon signals. The voltage applied to gate tube V-212 by means of potentiometer R-243 allows the different altitude variation of the A-N signals to be simulated by shaping of the potentiometer winding and selection of the gate tube circuit constants in a manner which will be apparent as a result of this disclosure. While not shown in Fig. 2, it is to be understood that a potentiometer operated by the range servo or equivalent means is connected to modify the relative intensity of the keyed A-N signals applied to the grid of gate tube V-212 in accordance with simulated horizontal range, in manner well known in the prior art.

Keyed signals to provide the desired code letters associated with each marker beacon to be simulated may be applied through gate circuits such as those shown to apply additional signals to amplifier U-220, input circuit resistors R-240 and R-241 representing input terminals at which two further such signals may be connected. As shown at 202, 201 and 205, 204 with relation to resolvers L-1 and L-2 in Fig. 2, each further resolver is provided with a manual positioning input so that the bearings of the simulated legs may be adjusted independently to any desired angles.

Occasionally it may be deemed desirable to simulate marker beacons which have their major axes arranged other than perpendicularly to their associated simulated range leg. Such simulated marker beacon orientation may be effected by providing a different phase relationship between the resolver output voltages and the marker station locator voltage. For example, an adjustable phase shifter (not shown) may be inserted to alter the excitation applied to the primary winding of any of the resolvers. Adjustment of such a phase shifter through a given number of electrical degrees serves to rotate the simulated marker station correspondingly about its center. While very many marker beacons are located so that their centers and minor axes lie at the centerline, or direction of equal A and N signal intensity of a range leg, it sometimes is desirable to locate simulated marker stations on other bearings, and in practicing this invention, it should now be obvious that the simulated marker beacon bearings from simulated range stations need not be selected to correspond to simulated range leg bearings although it is usual to select such bearings, and a common control shaft may be provided if desired so as to effect simultaneous adjustment of both. The details of the automatic keyer do not constitute a part of this invention and numerous well known types may be utilized, such as switches operated by motor-driven cams, or types utilizing the principles set forth in U.S. Patent 2,661,600, issued November 20, 1956, to Wright et al.

While the drawings herein disclose circuitry by which the resolver output voltages and the locator voltages are either relatively advanced in phase or relatively lagged in phase by 45 degrees to provide resolver output voltages which are either in-phase or in quadrature phase relationship to the marker locator voltages, it should become apparent that a single ninety degree shift made to the transverse component resolver voltage would provide equivalent operation and may be substituted. I prefer to provide adjustable phase shift means for two of the three voltages applied to each vector sum determining amplifier partly in order that the phase shifts caused by the resolver winding inductances may be compensated, but principally because phase shifters designed to provide 45 degrees phase shift provide less signal attenuation and better accuracy than ninety-degree phase shifters. Furthermore, it should be noted that in order to provide elliptical marker areas of the type described, it is not necessary that the voltages applied to the vector sum amplifiers include two voltages which are exactly in quadrature relationship to the third voltage. If any difference in gain or attenuation is used in applying the two resolver voltages to the amplifier, an elliptical area will result if any amount of phase shift (other than zero or 180 degrees) is used. Use of ninety-degree phase shift between the resolver voltages is preferred, however, since it allows independent adjustment of the major and minor axes of an ellipse. The phase shift means shown in the drawings of this application are exemplary only, and various other phase shifting circuits may be substituted without departing from the invention.

Fig. 6 illustrates several alternative arrangements to the circuitry of Fig. 2, only portions necessary for an understanding of the additional features being shown in Fig. 6, and portions corresponding to those of Fig. 2 being numbered similarly. To provide more uniform resolver operation and to allow the use of inexpensive uncompensated resolvers, I have provided an arrangement in which resolver primary winding excitation remains constant. In Fig. 6 the primary windings of resolvers L–1 and L–2 are shown connected directly to the alternating current supply, so that resolver primary excitation does not vary with simulated range or with simulated altitude. Resolvers L–1 and L–2 are mechanically positioned by the output shafts of mechanical differentials 201 and 204 in the same manner as in Fig. 2, and these details need not be repeated herein. The output voltages from the resolver secondary coils are routed to contacts of a conventional multi-level stepping switch SS, the transverse component voltages from the "horizontal" secondary coils being routed to contacts of the W level, and the "along the leg" component voltages from the "vertical" secondary coils being routed to contacts of the X level. Assuming that two markers having the same angular bearing from the station are to be provided, as explained above in connection with Fig. 2, so that the secondary voltages from a single resolver may be used for simulation of two markers, the voltage from a resolver secondary coil may be connected to two contacts of the W level or the X level, as shown in Fig. 6. While Fig. 6 shows each resolver secondary coil connected to a pair of adjacent contacts, it is not necessary that the contacts be adjacent, as will become apparent as the description proceeds. If eight simulated marker stations are to be provided, each level of the stepping switch should have eight or more contact positions. Connected to corresponding contacts of the Y level of stepping switch SS are voltages from individual marker locator potentiometers, and keyed audio signals from the keyer are connected to contacts of the Z level. The selector arms of the various levels of the stepping switch are mechanically ganged to rotate in synchronism as pulses are applied to coil LS of stepping switch SS.

Assuming the stepping switch to be in the position shown, the W level selector arm applies the voltage from coil $b$ of resolver L–1 to excite the winding of potentiometer R–601. The arms of potentiometers R–601 and R–602 are positioned by the range servo, thereby deriving from these potentiometers voltages commensurate with the transverse and the along-the-leg components, respectively, of simulated range between the simulated aircraft and the simulated radio range station. The transverse component voltage from potentiometer R–601 is applied to summing amplifier U–601 via a phase shift means shown as comprising capacitor C–601 and resistor R–612, and the along-the-leg component voltage is applied to amplifier U–601 via a phase shifter shown as comprising capacitor C–602 and resistor R–613. The Y level selector arm applies the marker locator voltages from potentiometer R–203 to amplifier U–601 via a phase shift means shown as comprising capacitor C–603 and resistor R–614. It should be apparent at this point that the voltages applied to amplifier U–601 are the same as those applied to amplifier U–201 in Fig. 2 except that the voltages applied to amplifier U–601 do not vary in accordance with simulated altitude. The output voltage from amplifier U–601, which is commensurate with the vector sum of the applied input voltages, is applied to excite potentiometer R–604, the arm of which is positioned by the trainer altitude servo, thereby deriving an alternating output voltage which varies in substantially the same manner as that from amplifier U–203 of Fig. 2. Relay K–601 ordinarily will be energized, with its contacts opposite from the condition shown, as will be explained below. This alternating voltage is rectified by a detector shown as comprising diode X–601 and applied to control gate tube V–601. Thus whenever the vector sum voltage applied to detector X–601 decreases below a predetermined level, gate tube V–601 passes the particular keyed audio signals being applied to its control grid by the Z level selector arm of the stepping switch.

Since marker areas are seldom if ever coincident, a combination of voltages having a vector sum low enough to open gate tube V–601 may be assumed to exist only for one position of the stepping switch at any given time. Further, it will be seen that it serves little useful purpose to determine the vector sums relating to those marker areas within which the simulated aircraft is not located. Therefore, I have provided multiplexing means which vastly decreases the cost of any installation designed to simulate a large number of marker beacons.

The stepping switch coil LS is connected through a gating means shown as comprising triode V–602. A conventional pulse source shown in block form, which may comprise a multivibrator or a motor-driven cam switch, for example, applies positive pulses at a low frequency, such as 1 or 2 per second, for example, to the grid of gate tube V–602. Whenever the positive output voltage from magnitude detector X–601 is sufficiently large to close gate V–601, it is sufficiently positive to open gate tube V–602, the grid of which is connected to the positive control voltage through two-stage non-inverting amplifier U–602. Whenever the simulated aircraft is situated away from the marker associated with the particular stepping switch contacts being connected to amplifier U–601, the positive output voltage from detector X–601 is sufficient to predominate over a negative biasing voltage applied to the grid of gate tube V–602 via resistor R–617. Pulses applied to gate tube V–602 from the pulse source serve to energize and de-energize coil LS of the stepping switch, and upon each de-energization of coil LS, the switch rotates all of its selector arms through one contact position. Thus the pulse source and stepping switch act as a sampling means, successively connecting three voltages associated with each marker station to amplifier U–601. As long as simulated flight continues outside of simulated marker areas the voltage output from rectifier X–601 remains large enough to keep gate tube V–602 open, and cycling continues. Whenever the simulated aircraft closely approaches or enters a simulated marker area, the voltage from detector X–601 decreases sufficiently so that when the stepping switch has rotated to the contact position associated with the marker, gate tube V–602 will close, preventing further rotation of the stepping switch until such a time as when the simulated aircraft has flown outside the marker area. At this later time, the voltage from detector X–601 will be large enough to open gate tube V–602, allowing further sampling to occur. Gate tube V–602 preferably is biased to close at a slightly higher output voltage from detector X–601 than that necessary to open gate tube V–601, so that the stepping switch will stop at a given marker position when the simulated aircraft is slightly outside the area in which marker signals would be received, thereby allowing some leeway in time, in case the stepping switch must rotate through many contact positions before coming to the contacts associated with the particular simulated marker area which the simulated aircraft is entering. The pulse frequency utilized is largely a matter of choice. It preferably should be high enough to cause rapid enough sampling to ensure sampling of each simulated marker voltage group during the time between closing of gate tube V–602 and opening of gate tube V–601, which may be seen to depend upon the number of markers multiplexed by a single stepping switch and the usual speeds of simulated flight, as well as various other arbitrary considerations. The pulse source frequency should be kept as low as feasible operationally to minimize wear of the mechanical parts of the sampling system. Various substitutions should now be obvious. While I prefer to utilize standard telephone type stepping switches which translate upon de-energization, switches which translate upon energization may be substituted readily, and, in fact, a motor-driven commutating switch may be substituted for the stepping switch. Various relay scanning systems also may be substituted without departing from the invention.

It will be seen that the arrangement of Fig. 6 allows use of a single audio signal gate tube, a single vector sum amplifier, a single magnitude detector, and requires only three phase shift means. It should be recognized that use of the same scale factors and same phase shift means for all simulated markers requires that all such markers be of the same size and same angle with respect to their bearings from their associated radio range station. To allow different marker area sizes and angular orientations if such arrangements are desired, separate phase shift and scale factor adjustments may be included in the contact circuits either in lieu of or in addition to the phase shift and scale factor means shown in Fig. 6. For example, resistor R–618 connected to the inner fan marker of range leg No. 1 contact of the W level of the stepping switch serves to attenuate the voltage applied to amplifier U–601 from secondary coil of resolver L–1, determining the transverse ellipse axis length of that simulated marker. If R–618 differs from R–619, the transverse axis of the range leg No. 1 outer fan marker will differ from that of the range leg No. 1 inner fan marker. Similarly, an additional phase shift is provided by capacitor C–604 and resistor R–620, shifting the phase of the marker locator voltage associated with the range leg No. 1 inner fan marker, so that the angular orientation of that marker differs from the outer fan marker. Similar attenuation and/or phase shift means may be provided to determine the shape and angular orientation of each simulated marker.

It will be recalled from Fig. 2 that keying of simulated Z marker signals may be provided by determining the magnitude of the vector sum of two range component voltages, the marker locator voltage being eliminated because cones of silence are centered at radio range station locations. It should be apparent now that "cone of silence" or Z marker positions may be included on the stepping switches utilized by leaving Y level contacts unconnected. Since cones of silence are generally circular in plan view, attenuation resistors ordinarily should be inserted in the "cone of silence" position contacts of the W and X levels of the stepping switches so that the transverse and longitudinal component voltages applied to amplifier U–601 during cone of silence simulation will have substantially the same scale factor. Keyed Z marker signals may be routed to cone of silence positions on the Z level of the stepping switches in the same manner as fan marker signals.

Since Z marker beacons usually vary with altitude in a somewhat different manner than fan marker beacons, more realistic simulation may be provided as shown in Fig. 6 by provision of means to substitute a different altitude signal modifying means when Z markers are simulated. The voltage on the Y level selector arm is amplified considerably by amplifier Z–605, rectified by rectifier X–605 and applied to operate the coil of relay K–601. Whenever the stepping switch is positioned at one of its fan marker positions, a marker locator voltage will be available for amplification to operate relay K–601, thereby closing contacts b and d of the relay and causing the vector sum output voltage of amplifier U–601 to be connected to be modified by potentiometer R–604. Whenever the stepping switch is positioned at its cone of silence or Z marker position, the Y level selector arm is positioned to an unconnected contact, as mentioned above, causing relay K–601 to be de-energized. Upon de-energization relay K–601 makes connections as those shown in Fig. 6, removing potentiometer R–604 and substituting potentiometer R–609, this latter potentiomter having a voltage versus shaft rotation characteristic commensurate with Z marker altitude variation and having its wiper arm positioned by the trainer altitude servo. A capacitor may be connected across the coil of relay K–601 to prevent opening of the relay as the stepping switch advances from one fan marker contact position to an adjacent fan marker contact position, since stepping switch rotation momentarily interrupts the voltages on the Y level selector arm.

Fig. 6 contemplates the provision of a separate sampling system for the group of markers associated with a single radio range station, since the altitude and range servos shown in block form provide shaft output quantities commensurate with simulated altitude and simulated range relative to a particular simulated radio station. It is within the scope of the invention, however, to provide a single multiplexing system for the markers associated with plural stations. By provision of a stepping switch having many contact positions, the resolver voltages and marker locator voltages associated with many markers may be connected to contacts of a single stepping switch, through scale factor and phase shift means, if desired, as mentioned above. If separate range servos are available in the trainer for each radio range station to be simulated, it is necessary that means be provided to switch the simulated range varying means at the proper intervals. Alternatively, a single range servo could be switched at proper intervals.

Fig. 7 illustrates an arrangement in which separate range servos are provided for three simulated radio range stations, and it will be understood that any number of such simulated stations may be provided. The range servos shown in block form in Fig. 7 may each comprise a range servo of the type shown in Fig. 3, for example, and each range servo will operate in conjunction with an individual simulated bearing servo (not shown) in the manner illustrated in Fig. 3, for example. The bearing servo associated with the station No. 1 range servo of Fig. 7 is mechanically connected to position the rotors of all of the resolvers (preferably four resolvers, not shown) provided to simulate marker beacons associated with radio range station No. 1, in the same manner that the bearing servo of Fig. 2 positions the rotors of resolvers L–1 and L–2. The bearing servos associated with the No. 2 and No. 3 station range servos position resolvers (not shown) provided to simulate markers of those stations in similar manner. The output voltages from the $b$ secondary coils of the resolvers are each routed to contacts of the W level of the stepping switch shown in Fig. 7, these connections (not shown) being made through various attenuation resistors in manner explained above so as to determine the size and shape of the resulting simulated marker areas. Similarly, the output voltages from the $a$ secondary coils of the resolvers are each routed to corresponding contacts of the X level. Voltages from the marker locator potentiometers are routed to corresponding contacts of the Y level, phase shift means (not shown) being provided if desired to determine the angular orientation of the marker areas in the manner explained above. The stepping switch is provided with many more contact provisions than shown in Fig. 2, a minimum of twenty-seven positions being preferred in constructing apparatus to simulate the fan markers and cones of silence of three radio range stations.

In Fig. 7 the three contacts shown on the left side of each level are associated with three markers of radio range station No. 3, the next two contacts of each level are associated with two markers of radio range station No. 2, and the two right side contacts of each wafer are associated with two markers of radio range station No. 1. The $b$ coil resolver voltage being sampled at any given time is routed by the W level selector arm through the "$a$" contact of one of three relays to excite one of three potentiometers. If the stepping switch is sampling voltages associated with simulated radio range station No. 1, contact $a$ of relay K–701 will be closed, applying the selected $b$ coil voltage to excite potentiometer R–7011. If the stepping switch is in a position so as to sample voltages associated with stations No. 2 or No. 3, contact $a$ of relay K–702 or K–703, respectively, will be closed instead, applying the selected $b$ coil voltage to excite potentiometer R–7012 or R–7013, respectively. In similar manner, the $a$ coil voltage sampled by the X level selector arm is routed through the $b$ contact of relay K–701, relay K–702 or relay K–703 to excite potentiometer R–7021, potentiometer R–7022 or potentiometer R–7023. As indicated in Fig. 7, the range servo associated with station No. 1 positions the arms of potentiometers R–7011 and R–7021, the windings of which are excited upon energization of relay K–701, thereby deriving voltages of the same nature as those derived by potentiometers R–601 and R–602 of Fig. 6, except that scale factor attenuation and phase shift is accomplished in Fig. 7 prior to selection, rather than after modification with simulated range as in Fig. 6. Similarly, whenever the stepping switch arrives at a station No. 2 or a station No. 3 contact position, potentiometer R–7012 and potentiometer R–7022 apply modified voltages from $a$ and $b$ coils of a resolver to amplifier U–701; or, potentiometer R–7013 and potentiometer R–7023 apply modified voltages from $a$ and $b$ coils of a resolver to amplifier U–701. Marker locator voltages from corresponding Y level contacts are applied to amplifier U–701 via resistor R–714.

To determine which potentiometers are used at any given sampling to modify the selected resolver voltages in accordance with simulated range, R, S and T levels are provided on the stepping switch. As shown in Fig. 7, whenever the stepping switch is at a radio station No. 1 position (the two clockwise contacts in Fig. 7), the T level selector arm applies a voltage to energize relay K–701. Similarly, the R level and S level selector arms apply voltages to energize relay K–703 or relay K–702 at various other stepping switch positions. Vector sum amplifier U–701 operates similarly to amplifier U–601 of Fig. 6, applying its output voltage to excite a potentiometer R–704 having its arm positioned in accordance with simulated altitude. The voltage on the arm of potentiometer R–704 is applied to magnitude detector X–701 to derive a direct control voltage for use in gating in the manner shown in Fig. 6. The control voltage from detector X–701 is shown applied to a signal gating circuit which may take the form of the V–601 circuit of Fig. 6, for example, and to a pulse source and gating circuit which may be of the nature shown at V–602 in Fig. 6. The apparatus of Fig. 7 also includes a Z level (not shown) on the stepping switch, which level serves to apply keyed signals to the signal gating circuit in the same manner as in Fig. 6. The pulse gating circuit may operate to translate the stepping switch of Fig. 7, in the same manner as in Fig. 6, although a higher pulse frequency should be used due to the increased number of switch contacts on the stepping switch of Fig. 7.

Inasmuch as the three radio stations simulated by the apparatus of Fig. 7 may be located at considerably different altitudes with respect to a reference such as sea level, I have provided means whereby modification of the marker signals may be made in accordance with the altitude of the simulated station with which they are associated. Potentiometer R–704 is shown connected through a series of normally closed contacts to ground, and the altitude servo drives the arm of potentiometer R–704 downwardly as shown in Fig. 7 for decreasing simulated altitude relative to sea level. Whenever relay K–701, relay K–702, or relay K–703 is energized, its contact $c$ is opened, inserting a resistance between the altitude potentiometer winding and ground. For example, if relay K–701 is energized, signifying that radio station No. 1 voltages are being sampled contact $c$ of relay K–701 inserts resistance R–721 into the circuit, increasing the output voltage from potentiometer R–704 in an amount substantially commensurate with the altitude of simulated station No. 1 above sea level. Adjustable resistors R–722 and R–723 are provided to furnish similar altitude adjustment of simulated stations Nos. 2 and 3. Inasmuch as the same altitude modification circuit is used for all of the markers associated with a particular radio range station, it will be seen that the apparatus of Fig. 7 assumes that all of the markers associated with a particular station are located at the same simulated altitude. If it is desired to provide different altitudes for different markers of the same station, a further level (not shown) may be provided on the stepping switch to substitute different resistors into the altitude-potentiometer circuit for each different simulated marker without departing from the invention.

Turning now to Fig. 8, there is shown an illustrative embodiment of a phase-correcting feature which may be utilized with many embodiments of my invention. Inexpensive resolvers are preferred for sake of economy, but many such resolvers provide varying small amounts of phase shift as they are rotated, providing an anomalous marker beacon rotation with simulated bearing change if left uncorrected. To obviate such erroneous simulation, means may be provided to detect the variation in resolver phase shift due to resolver rotation and to compensate for it. Fig. 8 illustrates how much means may be connected to apparatus generally of the type shown in Fig. 6, only a few portions of the apparatus of Fig. 6 being shown in Fig. 8 for sake of clarity.

The transverse component voltage from potentiometer R–601, the longitudinal component voltage from potentiometer R–602, and the marker locator voltage from the Y level selector arm are applied to vector sum amplifier U–601 via phase shifters in the same manner as in Fig. 6.

In addition, the longitudinal component voltage from potentiometer R-602, and a voltage from a further stepping switch level, designated the Y' level, are applied via summing resistors R-810 and R-811, respectively, to the input circuit of a conventional analog computer phase detector shown in block form. It will be recalled from Fig. 2 that when simulating a marker having its transverse axis perpendicular to its bearing line, that the marker locator voltage and the along-the-leg component voltage are made to be in-phase with each other, with both in quadrature phase relationship to the transverse component voltage. The contacts of the level of the stepping switch are connected to marker locator potentiometers in the same manner as the Y level contacts, except that no phase shifters (such as R-620 and C-604) are inserted. In constructing embodiments of the invention in which the major axes of all fan markers are intended to be perpendicular to their bearing lines no fixed phase shifts need be provided between the marker locator voltages and the longitudinal component voltages, and in such instances provision of a Y' level on the stepping switch is unnecessary, and the input voltages to the phase detector through R-811 may be taken from the Y level selector arm. Assuming use of a Y' level to allow irregular marker orientations, it will be seen that the only substantial phase difference between the two voltages applied to the phase detector will be caused by the inherent reactance of the particular resolver being sampled at a given time by the stepping switch. The average amount of resolver phase shift may be cancelled out by provision of a fixed phase shift means such as the resistor R-812-capacitor C-803 combination shown in Fig. 8. Thus the two input voltages applied to the phase detector of Fig. 8 will be substantially in phase with each other. However, if an inexpensive uncompensated induction resolver is utilized, the phase of the along-the-leg component voltage may change as the resolver rotates, causing that component voltage to contain a small component which is in quadrature relationship to the marker locator voltage. The phase detector shown in Fig. 8 receives the two substantially in-phase voltages and compares them with a quadrature voltage applied to the phase detector via conductor 809. If the two voltages applied to the phase detector are exactly in phase with the phase reference voltage on conductor 809, the phase detector will provide zero output voltage. If the resolver phase shift varies as the resolver rotates, the vector sum of the two input voltages applied to the phase detector will contain a component which is in phase with the quadrature reference voltage on conductor 809, causing the phase detector to provide a direct output voltage having a magnitude and a polarity commensurate with the magnitude and sense of resolver phase shift variation. The phase detector output voltage is applied via conductor 810 to a rebalancing means shown as comprising a servo-operated phase shifter. The phase correction servo shown in block form may comprise a conventional direct current position servo responsive to the phase detector output quantity and operable to vary a phase adjusting means shown as comprising potentiometers R-820, R-821 and capacitor C-805. The phase of the voltage applied to excite the various resolver coils may be seen to depend upon the position to which the phase correction servo has adjusted potentiometer R-821. Potentiometer R-820, the arm of which is positioned by the phase correction servo, serves to compensate for the change in circuit impedance as potentiometer R-821 is varied, thereby maintaining constant the magnitude of resolver primary excitation voltage as the phase of that voltage is adjusted. The phase correction servo varies the phase of the resolver primary excitation voltage, thereby varying the selected Y' level voltage applied to the phase detector through resistor R-811 since the selected Y' level voltage is derived from one secondary coil of a resolver. The phase correction servo varies the phase of resolver primary excitation so as to null out any difference in phase between the two voltages applied to the phase detector, and hence variation in resolver phase shift with resolver rotation is rendered harmless. As mentioned above, a reference voltage in quadrature with the voltages applied to the phase detector input circuit is required. This voltage is supplied by suitably shifting the phase of the alternating supply voltage, as by means of a phase shifter shown within dashed lines at 800. Although various different phase detectors may be utilized in this invention, my copending application, Serial Number 384,276, filed October 5, 1953, for "Automatic Radio Voltmeter" discloses an exemplary phase detector circuit which may be used.

If desired, the undesired quadrature voltage may be cancelled out by various arrangements which operate not to alter resolver primary winding excitation phase, but instead, which operate to apply an opposing quadrature voltage. For example, the phase detector of Fig. 8 may be supplied with a reference voltage on conductor 809 which is quadrature to the fixed voltage supplied to excite the marker locator potentiometers. The phase correction servo mechanical output may be used to apply a voltage from the source which excites conductor 809 to the input circuits of the phase detector and amplifier U-601, a potentiometer (not shown) being operated by the servo to apply the cancelling quadrature voltage via summing resistors (not shown) to the phase detector and amplifier U-601 input circuits so as to balance out the undesired quadrature voltage at amplifier U-601.

It should be recognized that the phase correcting feature of Fig. 7 may be employed with any embodiment of the invention, although individual phase correctors might be required for each resolver used if a multiplexing arrangement is not used. Also, it should be recognized that the altitude-modifying means selection circuit of Fig. 6 may be used with the circuit of Fig. 7, and that an altitude-modifying means switching circuit such as shown in Fig. 7 may be utilized if desired, in an arrangement such as shown in Fig. 6 in order to provide different simulated altitudes for each simulated marker associated with the same range station.

While I prefer to use induction resolvers due to their present lesser cost and better resolution, resistance resolvers could be used without departing from the invention. Throughout the drawings herein a number of buffer amplifiers and phase or polarity inversion amplifiers which would ordinarily be used have been omitted for sake of brevity and clarity, and those skilled in the art will have no trouble inserting such amplifiers where necessary. The various non-linear potentiometers utilized with the invention have been shown for convenience in the drawings as simple linear potentiometers, and a variety of well known techniques may be used for providing the desired functions from such potentiometers, some examples being the use of shunting resistors, the use of voltages to potentiometer taps from a voltage divider, the use of diodes and non-linear resistances, the use of varying resistance card widths, and the use of linear windings with non-linear mechanical wiper actuating means. To provide convenient mechanization of the signal gate circuits it often will be found desirable to use remote cut-off or variable mu pentodes. Those skilled in the art will recognize that a number of known equivalents exist for each of the gate circuits utilized. Series voltage summing may be substituted for parallel summing wherever desired.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Apparatus for simulating radio marker beacon reception comprising a source of signals operatively connected to an output circuit through a gate circuit, an induction resolver having a primary winding and a pair of secondary windings in quadrature with each other, means for exciting said primary winding with an alternating first potential in accordance with a simulated range of a simulated aircraft from a reference point, means for positioning said secondary windings in accordance with the angle between simulated bearing of said aircraft from said reference point and a desired bearing of a simulated marker beacon station from said reference point, a first of said secondary coils thereby providing a second potential substantially in accordance with the component of simulated range along said desired bearing and the second of said secondary coils thereby providing a third potential substantially in accordance with the component of simulated range perpendicular to said desired bearing, means for introducing a quadrature phase relationship between said second and third potentials, means for deriving an adjustable fourth potential commensurate with a desired simulated distance of said marker beacon station from said reference point, summing means responsive to said second, third and fourth potentials to provide a control potential in accordance with their vector sum, said gate circuit being responsive to said control potential to control transmission of said signals to said output circuit.

2. Apparatus in accordance with claim 1 in which said means for exciting said primary winding comprises means for modifying said alternating first potential in accordance with simulated range and further means for modifying said alternating first potential in accordance with simulated altitude of said simulated aircraft.

3. Apparatus for simulating radio signal reception comprising means for deriving a first alternating potential which varies in accordance with a first component of simulated range of a simulated receiving station from a first simulated radio transmission station, means for deriving a second alternating potential which varies in accordance with a second component of said simulated range, said second component being perpendicular to said first component, means for providing a quadrature phase relationship between said first and second potentials, means for deriving a further potential commensurate with a desired simulated radial distance of a second simulated radio transmission from said first station, summing means responsive to said first, second and further potentials and operative to provide a third potential having a magnitude varying in accordance with the vector sum of said first, second and further potentials, and a source of radio signals simulating signals being transmitted by said second station connected through a gate circuit to an output circuit, said gate circuit being responsive to said third potential to control transmission of said signals to said output circuit.

4. Apparatus according to claim 3 having means for modifying said first and second alternating potentials in accordance with simulated altitude of said simulated receiving station.

5. Apparatus according to claim 3 in which said further potential is in phase with said first alternating potential.

6. Apparatus according to claim 3 in which said means for deriving said first alternating potential and said means for deriving said second alternating potential comprise a source of alternating voltage, a resolver connected to be excited by said source and operative to provide two component voltages, means for mechanically positioning said resolver in accordance with the angle between the simulated bearing of said simulated receiving station from said reference point and the simulated bearing of said second simulated radio transmission located from said reference point, and further means for modifying said component output voltages in accordance with simulated range of said simulated receiving station from said reference point.

7. Apparatus according to claim 5 having phase detector means responsive to said first alternating potential and said further potential and operable to provide a phase control potential commensurate with the phase relationship between said potentials, and a phase shift means responsive to said phase control potential operable to maintain a pre-determined phase relationship between said potentials.

8. Apparatus according to claim 6 in which said further means comprises potentiometer means operable to modify the voltage applied from said source to excite said resolver.

9. Apparatus according to claim 6 in which said further means comprises two potentiometer means, each potentiometer means being excited by one of said component voltages and positioned in accordance with simulated range.

10. Apparatus for simulating radio signal reception comprising means for providing a plurality of simulated radio signals on a plurality of individual contacts of a selector switch, a gate circuit connecting a first selector arm of said selector switch to an output circuit, means for exciting a plurality of further contacts of said selector switch with voltages which vary in accordance with the simulated bearings of a simulated receiving station from each of a plurality of simulated radio transmission stations, said selector switch having further selector arms operable to apply a plurality of voltages from a plurality of said further contacts to voltage modifying means, said selector switch being arranged to connect simulated radio signals of a particular simulated radio transmission station to said gate circuit at the same time that a plurality of voltages corresponding to simulated bearings of the same station are connected to said voltage modifying means, said voltage modifying means comprising a pair of means for modifying a pair of said voltages from said further contacts in accordance with simulated range of said simulated receiving station from a reference point, means applying a pair of modified voltages from said voltage modifying means to a voltage summing circuit, means responsive to said summing circuit to provide a control signal to control said gate circuit, cycling means for causing said selector switch to successively apply voltages and signals associated with each simulated station, and means responsive to said summing circuit for causing said selector switch to stop at a position so as to apply voltages and signals associated with a simulated station located at a predetermined minimum simulated distance from said simulated receiving station.

11. Apparatus according to claim 10 having means connected to the output voltage from said summing circuit and operative to modify said voltage in accordance with simulated altitude of said simulated receiving station.

12. Apparatus according to claim 10 in which various groups of said plurality of simulated radio transmission stations each comprise a group of simulated marker stations associated with an individual simulated radio range station, in which said voltages applied to excite the plurality of said further contacts associated with said group of simulated marker stations vary in accordance with the differences between each of the simulated bearings from each of said simulated marker stations to said simulated radio range station and the simulated bearing of said simulated receiving station from said simulated radio range station.

13. Apparatus according to claim 10 having switch means for selectively connecting the output voltage from said summing circuit to one of a plurality of further voltage modifying means, said switch means being responsive to the instant position of said selector switch to selectively connect one of said further voltage modifying means in accordance with the character of the simulated radio transmission station associated with said instant position of said selector switch.

14. Apparatus according to claim 11 in which said means for exciting said plurality of further contacts associated with simulated marker stations associated with a particular simulated range station comprise a plurality of resolvers each having an input circuit excited by an alternating voltage and a pair of secondary output circuits arranged in mechanical quadrature relationship to provide a pair of component voltages, a simulated bearing servo operative to position each of said resolvers in accordance with the difference between the simulated bearings of one of said simulated marker stations with respect to said simulated range station and said simulated bearing of said simulated receiving station with respect to said simulated range station, a plurality of means for deriving a plurality of marker locator voltages each commensurate with the desired simulated distance of one of said simulated marker stations from said simulated radio range stations, and circuit means connecting said component voltages and said marker locator voltages to said plurality of further contacts.

15. Apparatus according to claim 12 having means for connecting the output voltage from said summing circuit to further voltage modifying means, said voltage modifying means being operable in accordance with simulated altitude to modify said output voltage, and switch means operable in accordance with the instant position of said selector switch to modify operation of said further voltage modifying means in accordance with the simulated altitude of the simulated transmission station associated with said instant position of said selector switch.

16. Apparatus according to claim 14 in which each of said simulated marker voltages is derived in phase with one of said component voltages.

17. Apparatus according to claim 14 in which one of said component voltages from each resolver is derived to be ninety degrees out-of-phase relative to the other of said component voltages from the same resolver.

18. Apparatus according to claim 1 in which said means for exciting said primary winding comprises means for modifying said alternating first potential in accordance with simulated range.

19. Apparatus according to claim 1 in which said means for exciting said primary winding comprises means for modifying said alternating first potential in accordance with simulated altitude of said simulated aircraft.

20. Apparatus according to claim 1 in which said second and third potentials are applied to said summing means with different scale factors, thereby causing said control potential to operate said gate circuit whenever said simulated aircraft travels within a simulated elliptical area, the center of said simulated elliptical area being radially displaced from said reference point in accordance with the magnitude of said fourth potential.

21. Apparatus for simulating marker beacon radio signal reception, comprising in combination, means for deriving a first alternating potential which varies in accordance with a first component of simulated range of a simulated aircraft from a reference location, means for deriving a second alternating potential which varies in accordance with a second and perpendicular component of said simulated range, phase-shift means connected to provide a relative phase shift between said first and second potentials, adjustable voltage-deriving means for providing a further alternating potential commensurate with a desired simulated radial distance of a simulated marker beacon transmitter from said reference location, vector summing means responsive to said alternating potentials and operative to provide a direct control voltage which varies in magnitude in accordance with the vector sum of said alternating potentials, and a source of signals simulating radio signals being transmitted by said marker beacon transmitter connected through a gate circuit to an output circuit, said gate circuit being controlled by said control voltage to apply said signals to said output circuit whenever said control voltage decreases in magnitude below a predetermined amount, said first and second potentials being applied to said vector summing means with different scale factors, thereby causing said gate circuit to apply said signals to said output circuit whenever said simulated aircraft is located within a substantially elliptical area simulating the radiation pattern of said marker beacon transmitter.

22. Apparatus according to claim 21 which includes further phase-shift means for introducing a relative phase-shift between said further alternating potential and each of said first and second alternating potentials.

23. Apparatus according to claim 21 in which said gate circuit comprises a multi-grid vacuum tube, said signals being connected to a first grid of said vacuum tube and said control voltage being connected to influence the bias of a second grid, thereby controlling output of said signals from said tube.

References Cited in the file of this patent

UNITED STATES PATENTS

| | | |
|---|---|---|
| 2,553,529 | Dehmel | May 15, 1951 |
| 2,560,528 | Dehmel | July 10, 1951 |
| 2,715,782 | Cooper et al. | Aug. 23, 1955 |

FOREIGN PATENTS

| | | |
|---|---|---|
| 569,440 | Great Britain | May 24, 1945 |